United States Patent
Obermeyer et al.

(10) Patent No.: US 11,326,581 B2
(45) Date of Patent: May 10, 2022

(54) WIND TURBINE

(71) Applicants: Sebastian Obermeyer, Hamburg (DE);
Jürgen Klugkist, Reinbek (DE);
Thorsten Schlüter, Barmstedt (DE);
Jörn Runge, Marklohe (DE)

(72) Inventors: Sebastian Obermeyer, Hamburg (DE);
Jürgen Klugkist, Reinbek (DE);
Thorsten Schlüter, Barmstedt (DE);
Jörn Runge, Marklohe (DE)

(73) Assignee: RWE Renewables GmbH, Essen (DE)

( * ) Notice: Subject to any disclaimer, the term of this patent is extended or adjusted under 35 U.S.C. 154(b) by 0 days.

(21) Appl. No.: 17/226,750

(22) Filed: Apr. 9, 2021

(65) Prior Publication Data
US 2021/0222679 A1    Jul. 22, 2021

Related U.S. Application Data

(63) Continuation of application No. PCT/EP2019/077044, filed on Oct. 7, 2019.

(30) Foreign Application Priority Data

Oct. 12, 2018  (DE) ..................... 10 2018 125 323.0

(51) Int. Cl.
| | |
|---|---|
| *F03D 13/25* | (2016.01) |
| *F03D 80/60* | (2016.01) |
| *F03D 80/80* | (2016.01) |
| *F03D 9/25* | (2016.01) |

(52) U.S. Cl.
CPC .......... *F03D 13/25* (2016.05); *F03D 80/60* (2016.05); *F03D 80/85* (2016.05); *F03D 9/255* (2017.02); *F05B 2240/95* (2013.01); *F05B 2260/20* (2013.01); *F05B 2270/303* (2013.01)

(58) Field of Classification Search
CPC .......... F03D 80/85; F03D 80/60; F03D 9/255; F03D 13/20; F03D 13/25; F05B 2260/20; F05B 2260/221; F05B 2240/95; F05B 2240/85; F05B 2270/303
See application file for complete search history.

(56) References Cited

U.S. PATENT DOCUMENTS

| | | | |
|---|---|---|---|
| 2011/0304149 A1* | 12/2011 | Pasteuning | ............. F03D 80/60 290/55 |
| 2013/0214538 A1* | 8/2013 | Himmelmann | ......... F03D 80/85 290/55 |

FOREIGN PATENT DOCUMENTS

| | | |
|---|---|---|
| CN | 106382193 A | 2/2017 |
| EP | 2568169 A1 | 3/2013 |
| EP | 3279469 A1 | 2/2018 |
| JP | 2015206327 A * | 11/2015 |

(Continued)

*Primary Examiner* — Richard A Edgar
(74) *Attorney, Agent, or Firm* — Reinhart Boerner Van Deuren P.C.

(57) ABSTRACT

A wind turbine, in particular an offshore wind turbine includes at least one hollow structural element, at least one cable inlet arranged in a bottom region of the hollow structural element. A first platform is arranged inside the hollow structural element, above the bottom region. At least one flow opening is arranged in the shell surface of the hollow structural element and penetrating the shell surface. At least one active control element is flow-connected to the flow opening to affect a media exchange between the interior of the hollow structural element and the exterior of the hollow structural element.

24 Claims, 8 Drawing Sheets

(56) References Cited

FOREIGN PATENT DOCUMENTS

| | | | |
|---|---|---|---|
| JP | 2015206327 A | 11/2015 | |
| WO | WO 2011091863 A1 | 8/2011 | |
| WO | WO-2018095643 A1 * | 5/2018 | ............ F03D 80/85 |
| WO | WO 2018095643 A1 | 5/2018 | |

* cited by examiner

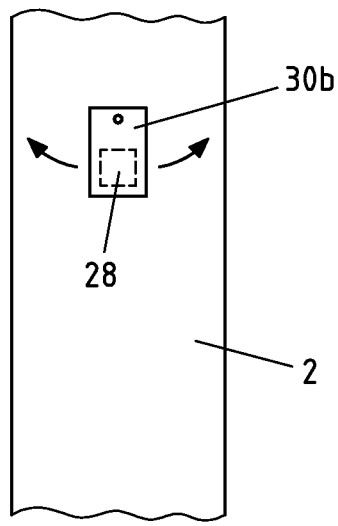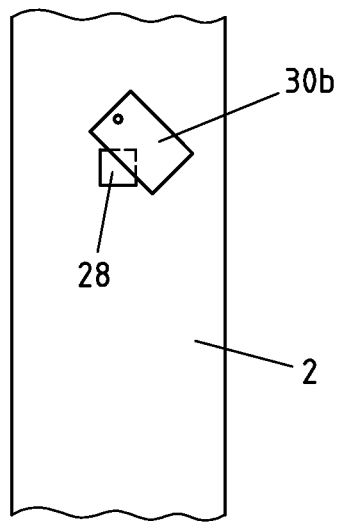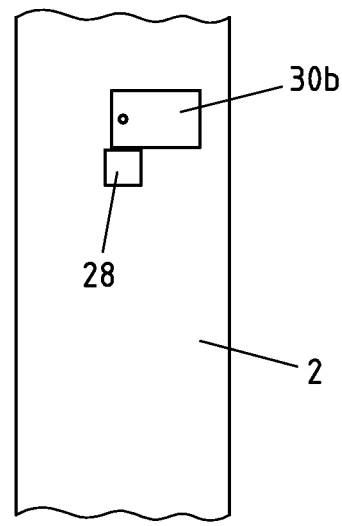
Fig.8a             Fig.8b             Fig.8c
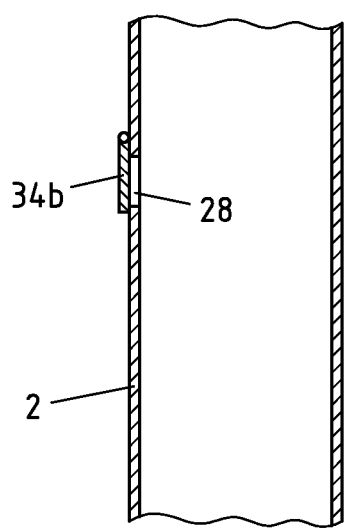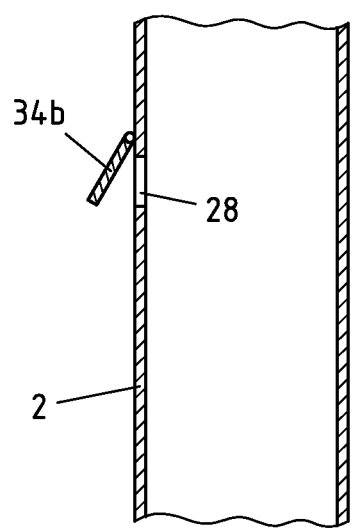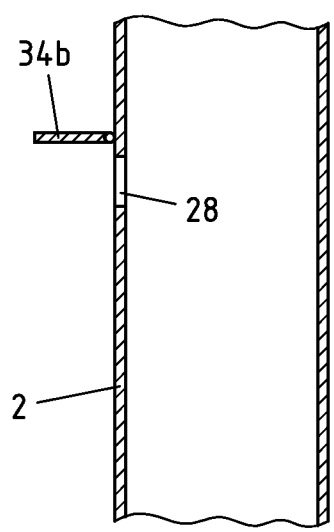
Fig.9a             Fig.9b             Fig.9c

WIND TURBINE

CROSS-REFERENCE TO RELATED PATENT APPLICATIONS

This patent application is a continuation of International Application No. PCT/EP2019/077044, filed on Oct. 7, 2019, which claims the benefit of priority to German Patent Application No. 10 2018 125 323.0, filed Oct. 12, 2018, the entire teachings and disclosures of both applications are incorporated herein by reference thereto.

FIELD OF INVENTION

The application relates to a wind turbine, in particular an offshore wind turbine.

BACKGROUND

Wind farms, in particular offshore wind farms, usually have to be connected to a power grid via a transformer station. A transformer station can be located directly at a wind turbine or as a transformer station within the wind farm. In offshore wind farms, a monopile is a common design for the foundation structure of a wind turbine. A monopile may have cable entries for submarine cables to connect the wind turbines to each other and/or to a transformer station.

Among other things, substations (transformer stations, substations) in offshore wind farms are founded using so-called jackets. For the electrical connection, so-called J-tubes are used, which are arranged on the outside of the jackets and which guide the submarine cables. J-tubes have also been used to date for the foundation of substations by means of monopiles in order to guide the submarine cables. However, the use of J-tubes is complex, error-prone and cost-intensive, so that solutions are being sought to dispense with them.

For this reason, it has already been proposed to route the submarine cables inside the monopiles. The submarine cables are routed upwards inside the monopile via the cable entries and mechanically fastened to a lower platform by means of cable hang-offs. Such a platform, also called air tight deck, offers the possibility to wire the submarine cables electrically.

The submarine cables that are used are usually armored cables, which are reinforced with a metallic sheath, in particular a steel sheath. The steel sheath is cast and clamped in the cable hang-off to secure the cable to the air tight deck. However, due to an increased number of cables, especially when several wind turbines are connected to a substation, temperature problems may occur within a monopile. Due to ohmic losses, Joule heat is generated in the cables. This heat must be dissipated at the monopile. In particular, a nominal conductor temperature of 90° C. must not be exceeded.

BRIEF SUMMARY

Based on this, the object was to avoid overheating of cables in a wind turbine or its foundation structure.

This object is solved by a wind turbine according to claim 1.

The wind turbine has a foundation structure, in particular a hollow structural element. In this context, the hollow structure element can be designed in particular as a monopile, tripile, tripod or gravity foundation with monopile. The hollow structural element can also founded in a floating manner.

At least one cable entry is provided in a bottom area of the hollow structural element, which is, in the installed state, below water level (Lowest Astronomical Tide, LAT). A separate cable entry may be provided for each cable to be inserted into the hollow structural element. More than 2, preferably more than 5, in particular 7 to 8 cables, preferably up to a maximum of 12 cables can be guided within the hollow structural element, so that a corresponding number of cable entries can be provided. The cables can be medium voltage cables as well as high voltage cables. Corresponding cable cross-sections may be provided.

If the hollow structural element is founded in the ground, the cable entries can preferably be located 1 m to 5 m above the ground, in particular the seabed, in the installed state. A scour protection may be provided below the cable entries and the cable entries are preferably located above the scour protection.

Within the hollow structural element, the cables are guided, in the installed state, from the cable entry to a first platform. Therefore, it is proposed that inside the hollow structural element, above the Lowest Astronomical Tide (LAT), a first platform is arranged. In particular, this first platform may be an air tight deck. Cable hang-offs can be provided on the first platform to which the cables are attached.

The cooling of the cables is problematic. Since several cables are routed simultaneously in the hollow structural element, as explained above, the interior of the monopile heats up considerably. Since the exchange of cooling medium between the interior and the exterior of the hollow structural element is impaired by the walls of the hollow structural element, the waste heat from the cables may not be sufficiently dissipated. For this reason, an active control element is proposed that causes a medium exchange between the interior of the hollow structural element and the exterior of the hollow structural element.

In particular, a medium can be air and/or water. The medium is in particular the ambient air of the hollow structural element and/or the seawater washing around the hollow structural element.

The shell surface of the hollow structural element may be the outer skin of the hollow structural element. In particular, this may be a metal sheet, especially a steel sheet. The flow opening connects the interior of the hollow structural element to the exterior of the hollow structural element. The flow opening can be a hole or other recess in the shell surface. Outside air can flow into the interior of the hollow structural element through the flow opening. Heated internal air can flow from the interior of the hollow structural element to the exterior via the flow opening. If the following refers to air or ventilation, this refers to the medium air. However, the statements then also apply to water, which can flow as a medium through the flow opening into the hollow structural element and out of the hollow structural element.

With the aid of the at least one control element, the exchange of medium between the interior and the exterior of the hollow structural element can be actively influenced, in particular controlled or regulated. In this case, unlike in purely passive systems, the flow velocity, the flow volume, the flow direction and/or the flow pressure are actively influenced by the control element. This means that the control element can influence how and to what extent the medium (air and/or water) flows through the hollow structural element along the cables in order to achieve a cooling effect on the cables.

As mentioned above, the hollow structural element can be a monopile. In this case, the hollow structural element may be floatingly founded or founded in the ground. It is also possible for the hollow structural element to be a tripile or tripod. Other hollow structural elements are also conceivable. In the case of hollow structure elements, the cables can be routed internally, so that J-tubes can be omitted.

The wind turbine at issue may in particular be a substation, also called a transformer station or sub-station. In a substation, cables of a plurality of wind turbines of a wind farm converge. These cables are preferably fed into the interior of the hollow structural element via the cable entry. Cooling of the interior of the hollow structural element takes place through the flow opening. It is also possible that the wind turbine is a wind mill. In the wind mill, a plurality of cables may be guided within the hollow structural element, which may be objectively cooled via the flow opening.

Flow openings may be provided in the hollow structural element at the outer skin. The at least one control element can be arranged at at least one of these openings. At least one flow opening may be arranged above the platform in the hollow structural element. In such a case, the medium must be guided through the platform to the interior of the hollow structural element below the platform. However, the platform may serve to receive the control element so that it can be easily mounted in the hollow structural element. Also, at least one flow opening may be arranged below the platform in the hollow structural element. Then the medium can flow directly through the outer skin and reach the cables.

The control element may be arranged directly at the flow opening. This allows the flow of medium through the flow opening to be directly influenced by the control element. A change in the setting of the control element has a direct influence on the flow behavior of the medium through the flow opening.

For cooling the cables, it is also proposed that the flow opening is flow-connected to the interior of the hollow structural element below the platform via a tube (ventilation tube in the case of air, flow tube in the case of water). Through the tube, it is possible to guide the medium inside the hollow structural element, so that cooling below the platform is as uniform as possible. Thus, it can be achieved that the maximum conductor surface temperature of 90° C. is preferably not reached at any point along the cables from the platform to the water surface.

The active corrosion protection system may be located below the platform. This gives rise to chlorine gases. In the case of a ventilation system, these must not be allowed to enter accessible areas. Thus, it is necessary to make the ventilation tubes as gas-tight as possible up to the outlet opening.

It is also proposed that the control element is arranged between the flow opening and the tube, between the flow opening and the interior of the hollow structural element, or on the outside of the flow opening. If the control element is arranged between the flow opening and the tube, the medium can flow into the tube through the flow opening and the control element. In this case, the flow of medium in the tube can be influenced by the control element. In particular, a flow volume through the tube can be increased compared to a natural flow, for example caused by wind. The control element can also be arranged inside the hollow structural element and thus be protected from environmental influences. If the control element is arranged on the outside of the flow opening, it can be maintained particularly easily. This applies in particular if the flow opening is located below the platform, since the opening is otherwise no longer accessible from the inside after the hollow structural element has been installed.

It is also proposed that at least one flow opening is an outflow opening (exhaust opening) and/or that at least one flow opening is an inflow opening (supply opening). Through an inflow opening, medium can be directed into the interior of the hollow structural element. Via an outflow opening, medium can be conducted from the interior of the hollow structural element to the exterior.

According to an embodiment, the control element can be a fan, in particular a blower. The fan can draw in outside air via the flow opening and blow it into the ventilation tube or the interior of the hollow structural element. The fan can draw in internal air via the flow opening and blow it out to the outside. The fan allows for increased air exchange. This promotes the cooling performance of the system. A fan, nozzle or propeller can also serve as a control element. In particular, a nozzle or propeller may be useful for water.

It is also proposed that the control element is a controllable flap and/or shutter. In this case, the flap and/or shutter can be opened or closed as well as moved, for example, stepwise or steplessly in at least two positions between an open position and a closed position. This allows the flow cross-section at the flow opening to be varied. Adjusting the flap and/or closure also has the effect that it can be cleared of incrustations and/or accretions and/or marine growth. Adjustment can be motorized, in particular by electric motor, or manual, in particular via sliding doors or lens shutters.

The flow opening can be closed by a grid or a net, which is permeable for the medium but impermeable for larger objects such as flotsam or animals. This prevents debris or animals from entering the interior of the hollow structural element. In addition, the flow openings above the Lowest Astronomical Tide (LAT) can be angled downward on the outside to prevent rainwater from entering.

Preferably, the platform is designed with cable hang-offs so that it has a cable suspension system that accommodates the cables inserted through the cable entry into the hollow structural element.

To allow the supply air from the outside into the ventilation tube, a first opening is provided in the platform at the bottom side. This first opening is in the area of the flow opening and in particular in the area of the ventilation tube. The ventilation tube is preferably arranged directly at the first opening.

The platform is preferably an air tight deck, which has no other openings except for the proposed floor-side openings and a maintenance flap. In particular, the air tight deck is substantially airtight and divides the hollow structural element into a bottom region and a top region. The top region is above the platform and the bottom region is below the platform.

The flow opening is flow connected to the ventilation tube via the first opening. Thus, air can flow from the flow opening through the first opening into the ventilation tube and provide cooling for the cables in the bottom region.

The (ventilation) tube extends along the longitudinal axis of the hollow structural element. This allows for cooling of the cables along the longitudinal axis of the hollow structural element. The (ventilation) tube may be arranged on an inner wall of the hollow structural element. In this case, the (ventilation) tube may run parallel to the longitudinal axis of the hollow structural element. It is also possible for the hollow structural element to be helically circumferential about the longitudinal axis of the hollow structural element. Also in this case, the (ventilation) tube may be arranged on the inner wall of the hollow structural element. In the installed state, the ventilation tube is preferably arranged extending vertically on the inner wall of the hollow structural element. However, the ventilation tube may also be arranged freely suspended from the underside of the air tight deck.

For cooling the cables, it is proposed that the (ventilation) tube has outflow openings at intervals from one another, in particular at regular intervals from one another. Via these outflow openings, the supply air/water can flow from the (ventilation) tube into the interior of the hollow structural element and thus cool the air/water there. The outflow openings ensure that the supply air/water flows into the interior of the hollow structural element as evenly distributed as possible.

According to an embodiment, it is proposed that the outflow openings of the (ventilation) tube are formed as slots or holes and/or that the outflow openings of the (ventilation) tube are directed towards the center of the hollow structural element. As mentioned above, the (ventilation) tube is arranged in the area of or directly at the inner wall of the hollow structural element. The cables usually hang in the center of the hollow structural element, so that the inflowing air/water flows as radially inward as possible. Therefore, the outflow openings are preferably directed towards the center of the hollow structural element. Also, the (ventilation) tube can be arranged centrally in the hollow structural element and the ventilation openings can point radially outward. The incoming air/water can then be blown out to all sides.

On the bottom side of the ventilation tube, an outflow of the incoming air can be enabled via a bottom-side opening of the ventilation tube or a bottom-side outflow opening. The ventilation tube can have a bottom with an outflow opening or be formed without a bottom, open on the bottom side. In both cases, an outflow of the supply air takes place.

According to an embodiment, it is proposed that the ventilation tube ends at the bottom side in the installed state at a distance from a sea water level. The distance is preferably a few meters above LAT. In particular, the distance is less than 21 m above LAT. In particular, the distance is selected depending on the tidal range of the installation site of the hollow structural element. The distance is preferably chosen so that at HAT (highest astronomical tide) there is still a certain distance between the bottom of the ventilation tube and the water spout.

In order to remove heated air from the hollow structural element, it is proposed that at least one flow opening in the manner of an outflow opening is arranged in the hollow structural element. It is possible that the outflow opening is arranged above or below the platform. It is also possible for a plurality of outflow openings to be provided along the vertical axis or along the circumference of the hollow structural element. Hereby, if necessary, a uniform outflow of the heated medium can be achieved.

Also, a plurality of flow openings may be formed as inflow openings. The inflow openings can be provided along the vertical axis or along the circumference of the hollow structural element. Through this, a uniform inflow of fresh medium into the hollow structural element can be achieved, if necessary.

In order to be able to guide the outflow air through the platform, it is proposed that the platform has a second opening on the floor side, in particular in the region of the outflow opening.

Via the second opening, the outflow opening is flow-connected to the interior of the hollow structural element below the platform. Thus, air can flow from the interior of the hollow structural element below the platform to the outflow opening via the second opening and can be discharged from there to the outside.

In order to detect the temperature in the hollow structural element, it is proposed that at least one temperature sensor is arranged in the interior of the hollow structural element below the platform. Via this temperature sensor, it is possible to detect whether the cables are below the nominal conductor temperature. The temperature sensor can be used to control or regulate at least the control element.

For example, if the temperature exceeds an upper limit, one or both of the fans can be turned on (or a fan shutter and/or shutter can be opened) when the temperature is controlled, and at least one of the fans can be turned off (or a fan shutter and/or shutter can be closed) when the temperature falls below a temperature. The switching on and off or opening and closing of the control element depending on the temperature can be controlled by a hysteresis. It is also possible that depending on the temperature the power of one or both fans is controlled or the degree of opening of a fan flap and/or shutter is controlled. A P, PI or a PID control of the control element depending on the temperature is possible.

If the current intensity in one or more cables exceeds a limit value, either individually or in total, cooling may become necessary. It is therefore proposed that at least one current sensor is arranged on at least one of the cables. Via this current sensor, it is possible to detect whether the joule heat emitted by the cables makes cooling necessary or not. The current sensor can be used to control or regulate at least the control element.

If the current exceeds an upper limit, at least one or both of the fans may be turned on (or a damper and/or shutter may be opened) when controlled, for example, and at least one of the fans may be turned off (or a damper and/or shutter may be closed) when the current falls below an upper limit. The switching on and off or opening and closing of the control element depending on the current intensity may be controlled depending on the current intensity, in particular via a hysteresis. It is also possible that depending on the current strength the power of the control element, in particular of one or both fans, is controlled or the degree of opening of a flap and/or shutter is controlled. A P, PI or a PID control of the control element depending on the current intensity is possible.

Cooling of the interior of the hollow structural element below the platform is particularly necessary in the summer months. In the winter months, the cables may heat up more due to the greater power. In order to utilize the joule heat of the cables, it is possible to conduct this waste heat not to the outside via the exhaust air openings, but into the interior of the hollow structural element above the platform, in particular into the technical equipment located there, especially the substation. For this reason, a flow valve is provided at the exhaust air opening. This flow valve can in particular be a $3/2$ flow valve.

With the aid of the flow valve, it is possible to supply medium via the second opening either to the outlet opening or into the interior of the hollow structural element above the platform, as required. For this reason, it is proposed that an inlet of the flow valve is flow-connected to the second opening and/or the fan. Thus, medium flows into the flow valve from the interior of the hollow structural element below the platform via the inlet. A first outlet of the flow valve may be flow connected to the outlet opening, and a second outlet of the flow valve may be flow connected to the interior of the hollow structural element above the platform. Thus, it is possible, if necessary, to either guide the exhaust air/medium to the outside via the outlet opening or to use it inside the hollow structural element for heating purposes, if necessary.

BRIEF DESCRIPTION OF THE DRAWINGS

In the following, the subject matter is explained in more detail with reference to a drawing showing embodiments. In the drawing show:

FIG. 8a-c a ventilation flap and/or closure according to an embodiment;

FIG. 9a-c a ventilation flap and/or closure according to a further embodiment.

DETAILED DESCRIPTION

Figure 1A:
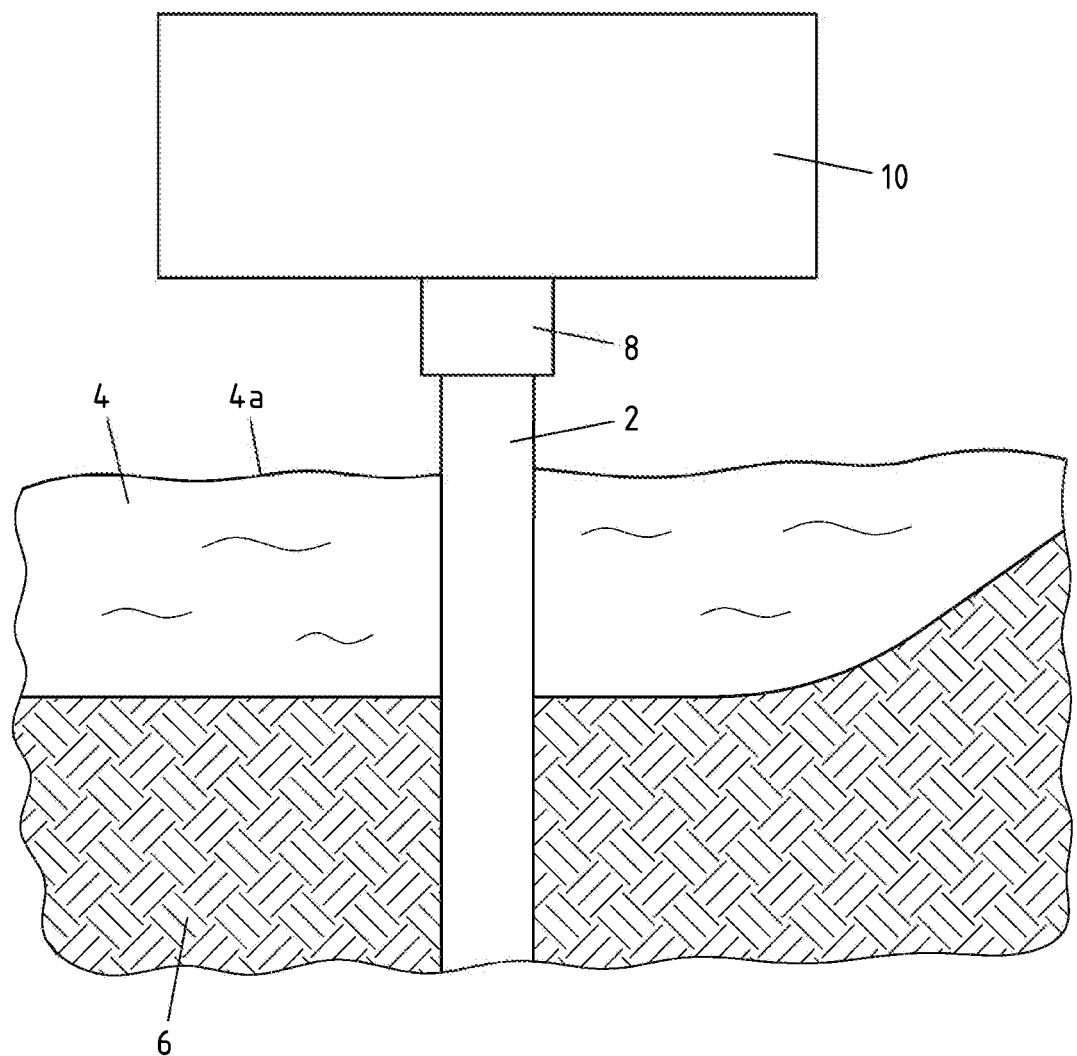
FIG. 1a-c various hollow structural elements with different foundations.

FIG. 1a shows a monopile 2 as a hollow structural element. The monopile 2 is founded on the seabed 6 in open sea 4. The monopile 2 protrudes beyond LAT 4a and is connected to a turbine of a wind turbine, for example a sub-station 10, via a transition piece 8.

Figure 1B:
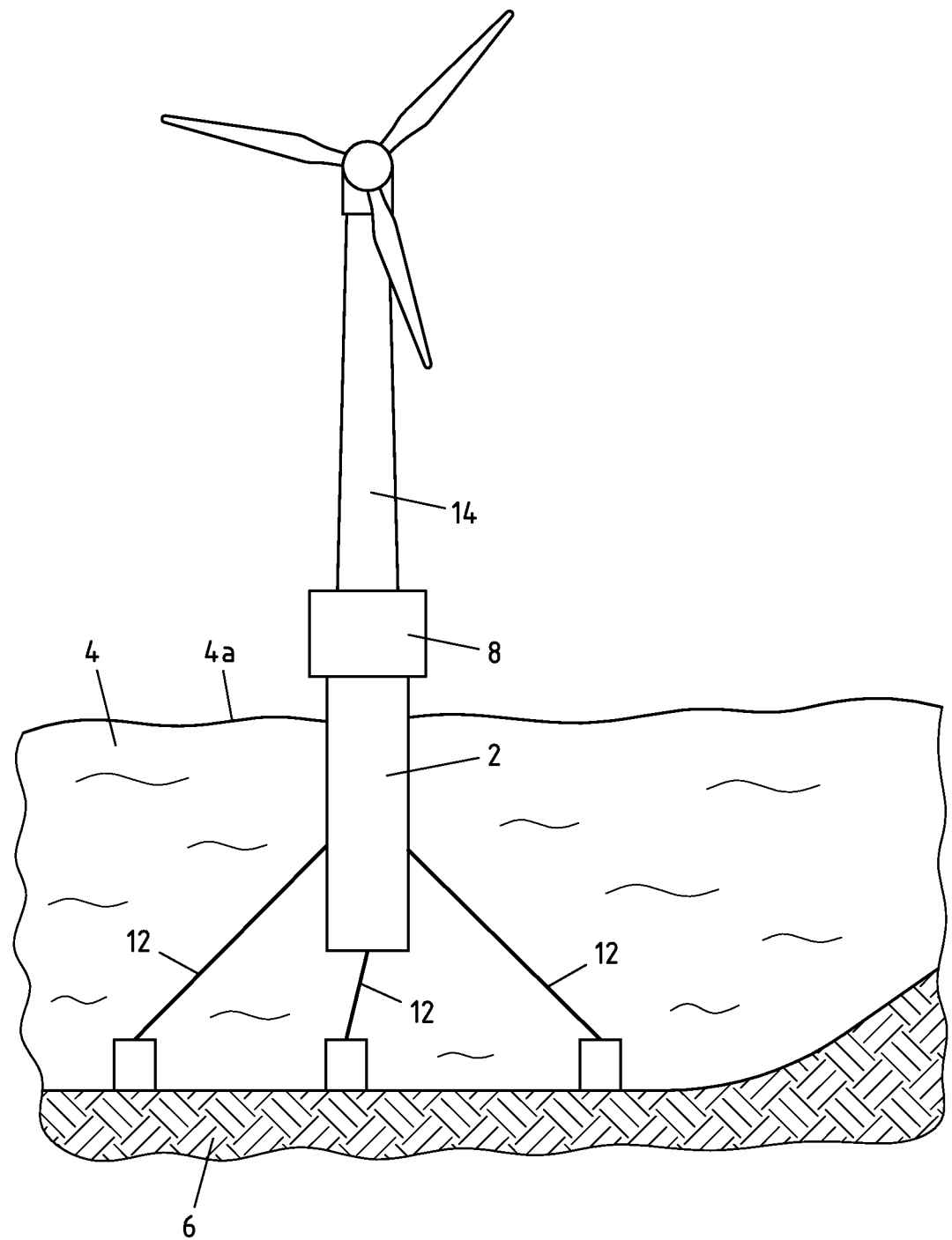

Another hollow structure element is shown in FIG. 1b. Here, too, a monopile 2 is provided, which, however, is floating and is founded in the seabed 6 via anchors 12. By way of example, it is shown that another tower 14 is attached to the transition piece 8, for example supporting a wind turbine.

Figure 1C:
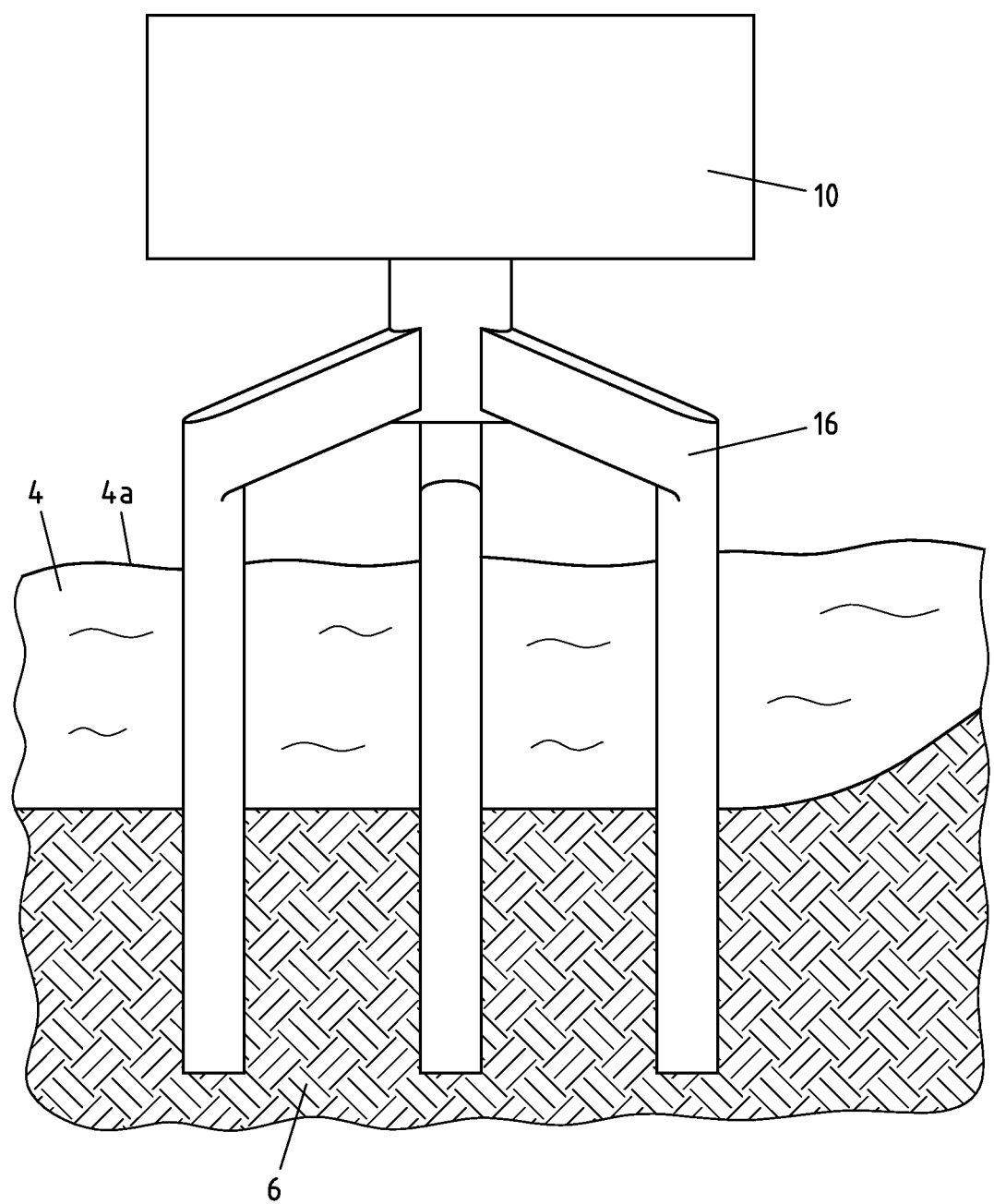

Another possible foundation of a hollow structural element is shown in FIG. 1c. Here, a tripile 16 serves as a support for a sub-station 10 and is founded in the ground 6.

These and other hollow structural elements as supports for wind turbines, for example wind turbines or substations, are suitable for the present arrangement of a cooling system.

Figure 2:
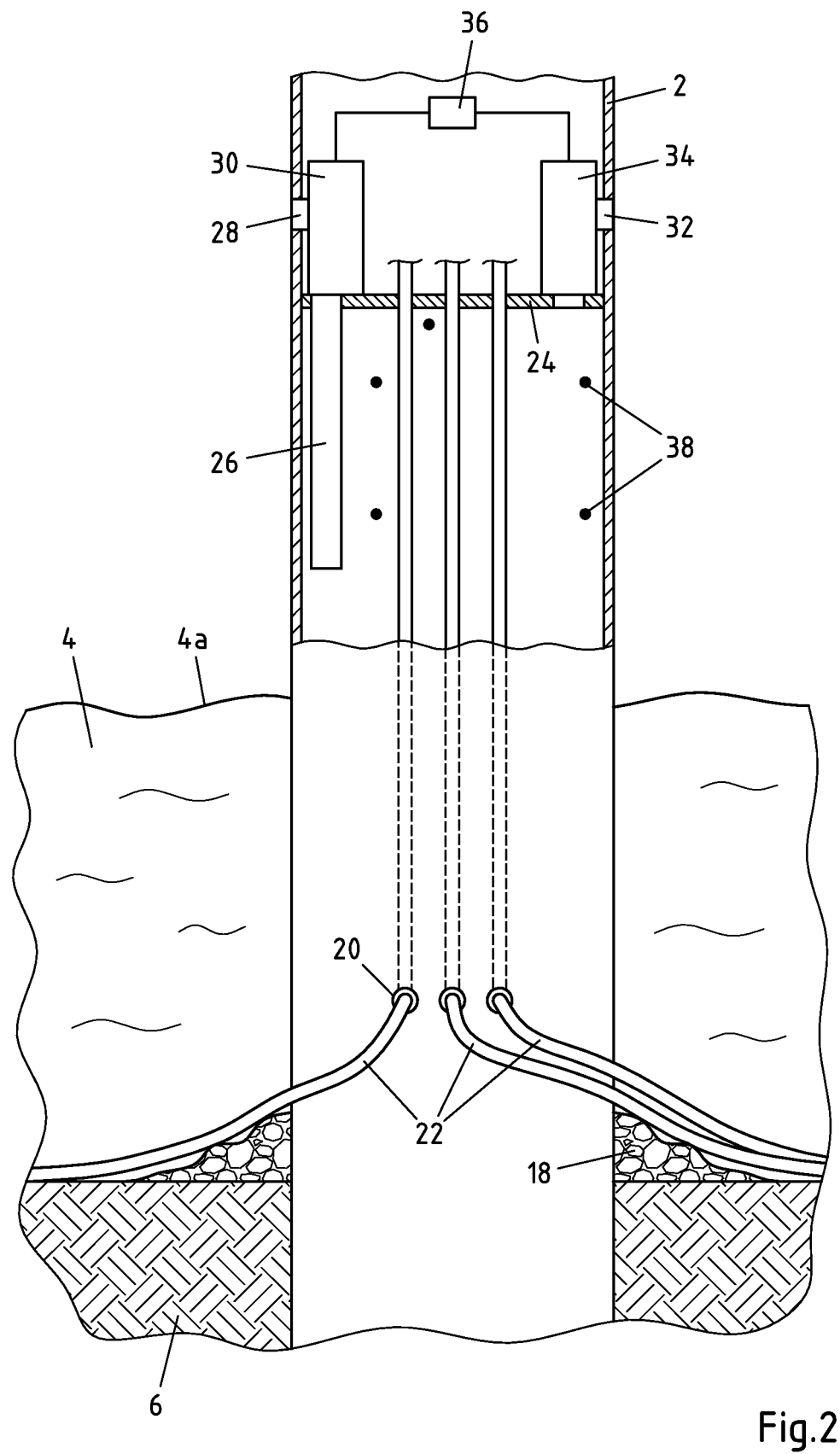
FIG. 2 a hollow structural element according to an embodiment.

FIG. 2 shows a monopile 2 which is founded in the ground 6. Above a scour protection 18, approximately at a distance of 1 m to 5 m above the bottom 6, there are cable entries 20. Submarine cables 22 are guided through the cable entries 20 into the interior of the monopile 2. The submarine cables 22 are armored cables, for example with a steel reinforcement. They are guided inside the monopile from the cable entries 20 to a first platform 24. The submarine cables 22 are suspended from the platform 24 via cable hangers (not shown). The platform 24 is also referred to as an air tight deck, as the submarine cables 22 are routed from the bottom of the platform 24 to the top of the platform 24 in a substantially isolated manner. On the top of the platform 24, the submarine cables 22 can be interconnected as needed, for example with a transformer station not shown.

Due to the cable routing inside the monopile 2, more than two, for example five, six, eight or ten submarine cables 22 may be routed inside the monopile 2 at the same time. Due to ohmic losses, joule heat is generated at the submarine cables 22, which must be dissipated. Unlike previous installations where the submarine cables 22 were routed outside the monopile 2 in J-tubes where they could be cooled by the ambient air, this option is only available to a limited extent in a present arrangement. The exchange of air inside the monopile 2 with the outside air is almost non-existent, so that, especially at high outside temperatures, the submarine cables 22 could exceed their nominal conductor temperature of, for example, 90° C.

To prevent this, it is proposed that the submarine cables are cooled within the monopile 2 below the platform 24 via a ventilation tube 26. For this purpose, a flow opening 28 is provided in the monopile 2 above the platform 24. The flow opening 28 breaks through the outer skin of the monopile, allowing air to flow from the outside to the inside. A blower 30 is arranged at the flow opening 28. This blower 30 has its inlet flow-connected to the flow opening 28 and its outlet flow-connected to the ventilation tube 26 via a first opening in the platform 24. The blower 30 draws in air from the outside via the flow opening 28 and blows it into the interior of the monopile 2 under the platform 24 via the ventilation tube 26. This achieves a cooling effect on the cables 22.

In order to increase the cooling effect, it is proposed that a flow opening is provided as an exhaust air opening 32 also penetrating the outer skin of the monopile 2. A blower 34 is provided at the exhaust opening 32. The blower 34 is connected to the interior space below the platform 24 via a second opening in the platform 24 having an inlet. The outlet of the blower 34 is at least flow-connected to the exhaust air opening 32, so that air is drawn in from the interior of the monopile 2 below the platform 24 via the blower 34 and is blown outward via the exhaust air opening 32. This achieves an air flow in the interior of the monopile 2 below the platform 24, which is used to remove heated air. Thus, an optimized cooling of the submarine cable 22 is achieved.

The blowers 30, 34 may be controlled by a processor 36. The processor may be connected to temperature sensors 38 located within the monopile 2 below the platform 24 (not shown). The connection may be wired or wireless. Depending on the temperature measured by the temperature sensors 38, the processor 36 may also control the blowers 30, 34. In particular, P, PI, or PID control may be performed to adjust the output of the blowers 30, 34. The processor 36 may also effect control of the blowers 30, 34 via a current intensity measured by a current sensor (exemplarily shown in FIG. 7).

Figure 3:
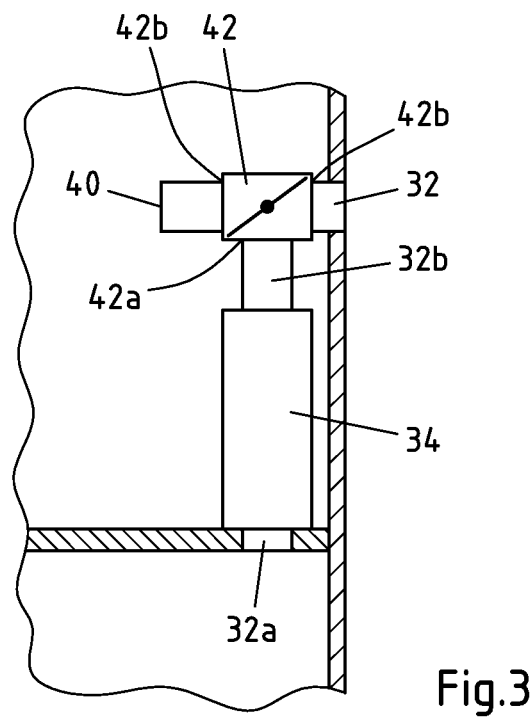
FIG. 3 a flow valve according to an embodiment.

FIG. 3 shows a variant in which the heated air from the interior of the monopile 2 is not necessarily blown out via the exhaust opening 32, but can be used for heating purposes during the winter months, for example, An inlet 32a of the blower 34 may be connected to the interior of the monopile 2 below the platform 24. An outlet 32b of the blower 34 may be connected to a flow valve 42. The flow valve 42 may be a ½ valve having an inlet 42a and two outlets 42b. A first outlet 42b may be flow connected to the exhaust opening 32, and a second outlet 42b may be connected to the interior of the monopile 2 above the platform 24 via an opening 40. Depending on the valve position of the flow valve 42, the heated air drawn in via the inlet 32a can thus either be blown out via the exhaust air opening 32 or blown into the interior of the monopile 2 via the opening 40 and protect technical equipment there from frost damage.

Figure 4A:
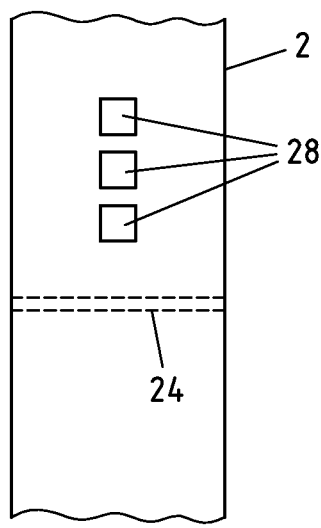
FIG. 4a, b different supply air and exhaust air openings, respectively.

FIGS. 4a, b show a wide variety of shapes for flow openings 28. Exhaust openings 32 can be designed accordingly. It can be seen that the flow openings 28 are arranged above the platform 24 on the outer skin of the monopile 2.

Figure 4B:
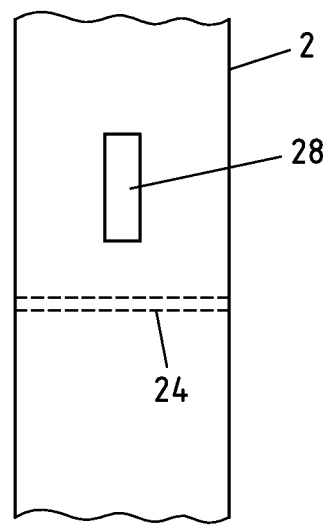

The flow openings 28 may be formed by a plurality of openings as shown in FIG. 4a, or may be a single opening as shown in FIG. 4b.

Figure 5:
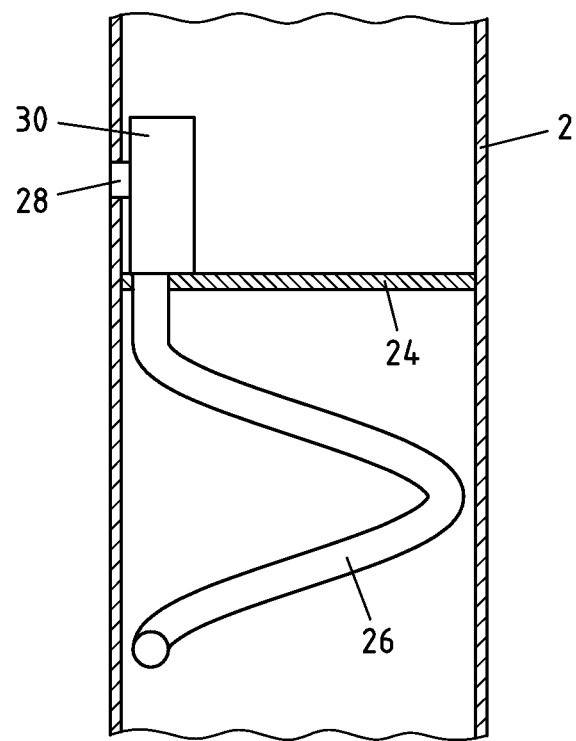
FIG. 5 an arrangement of a ventilation tube according to an embodiment.

To distribute the sucked-in outside air inside the monopile 2, the ventilation tube 26 is preferably arranged parallel to the longitudinal axis of the monopile 2 on an inner wall of the outer skin of the monopile 2. According to FIG. 2, the ventilation tube 26 extends vertically in the installation position. Another arrangement is shown in FIG. 5, where the ventilation tube 26 is arranged helically circumferentially on the inner wall of the outer skin of the monopile 2. This enables a more uniform distribution of the intake supply air within the monopile 2.

Figure 6:
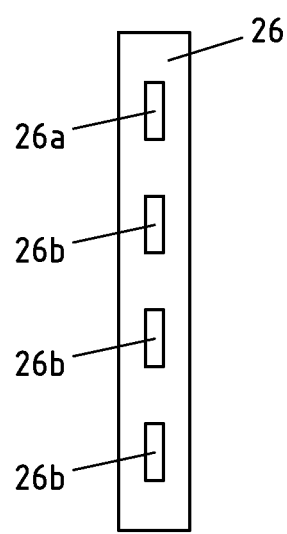
FIG. 6 an ventilation tube with openings according to an embodiment.

Openings 26a may be provided in the ventilation tube 26, as shown in FIG. 6. The openings 26b may, for example, be slot-shaped at regular intervals from one another. The openings 26a may be shaped facing the central axis of the monopile 2. The air drawn in from the ventilation tube flows into the interior of the monopile 2 via the openings 26a.

Figure 7:
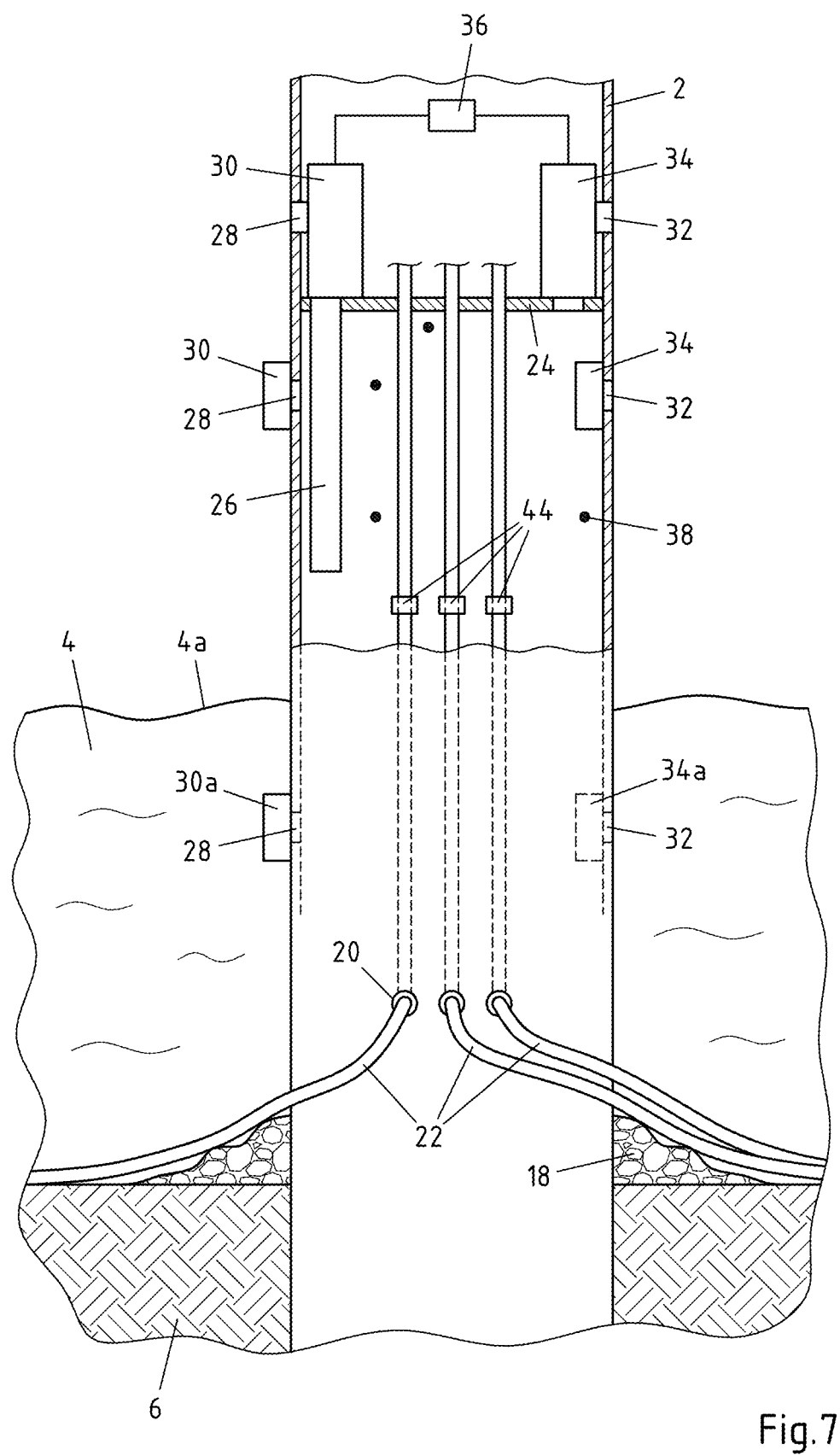
FIG. 7 a hollow structural element according to another embodiment.

FIG. 7 shows an embodiment example in which instead of the ventilation tube, a flow of cooling medium through the monopile 2 takes place directly via the flow openings 28, 32. It can be seen that flow openings 28, 32 can be arranged below the platform 24 in the outer skin of the monopile 2 above LAT 4a and/or below LAT.

In the case where the flow openings are arranged above LAT 4a, a blower 30, 34 may be arranged inside the monopile 2 and/or outside the monopile 2, as shown. In this case, the blower 30, 34 may be arranged directly at a flow opening 28, 30.

In case the flow openings are arranged below LAT 4a, a propeller or nozzle 30a, 34a may be arranged inside the monopile 2 and/or outside the monopile 2, as shown. In this regard, the fan 30a, 34a may be arranged directly at a flow opening 28, 32.

A current sensor 44 may be arranged on one or more cables 22. This may be, for example, a Rogowski coil. This can be used to measure a current in the cables 22 and use this to drive control devices such as fans 30, 34, propellers 30a, 34a or fan flaps and/or shutters 30b, 34b (shown below), via the processor 36.

FIGS. 8a-c show various positions of laterally pivotable fan flap and/or shutter 30a pivotably arranged on the inside or outside of the monopile 2 at a flow opening 28, 32. FIG. 8a shows a closed position, FIG. 8b shows an intermediate position, and FIG. 8c shows an open position. Depending on the position, the flow cross-section in the flow opening 28, 32 changes so that a flow of medium (air and/or water) can be influenced. The position can be adjusted by the processor 36, in particular controlled by the measured temperature or the measured current intensity.

FIGS. 9a-c show various positions of forwardly pivotable fan flap and/or shutter 30a arranged on the inside or outside of the monopile 2 at a flow opening 28, 32. FIG. 9a shows a closed position, FIG. 9b shows an intermediate position, and FIG. 9c shows an open position. Depending on the position, the flow cross-section in the flow opening 28, 32 changes so that a flow of medium (air and/or water) can be influenced. The position can be adjusted by the processor 36, in particular controlled by the measured temperature or the measured current intensity.

LIST OF REFERENCE SIGNS

2 Monopile
4 Lake
4 LAT
6 Seabed
8 Transition Piece
10 Substation
12 Anchor
14 Tower
16 Tripile
18 Scour protection
20 Cable entry
22 Submarine cable
24 Platform
26 Air inlet or outlet tube
28 Flow opening
30 blower
30a Propeller
30b Fan flap and/or shutter
32a Exhaust air opening
34 blower
34b Fan flap and/or shutter
34a Propeller
36 Processor
38 Temperature sensor
40 Opening
42 Flow valve
44 current sensor All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. Wind power plant, in particular offshore wind power plant comprising:
    at least one hollow structural element,
    at least one flow opening arranged in a shell surface of the hollow structural element and breaking through the shell surface, wherein
    at least one active control element is flow-connected to the flow opening and influences a media exchange between the interior of the hollow structural element and the exterior of the hollow structural element wherein
    the flow opening is flow-connected to the interior of the hollow structural element below a platform via a ventilation tube
    wherein
    at least one cable entry is arranged, in an installed state, in a bottom region of the hollow structural element below sea water level, and
    the platform is a first substantially airtight platform is arranged inside the hollow structural element, above the bottom region.

2. Wind power plant according to claim 1,
    wherein
    at least one further flow opening is arranged above the platform in the hollow structural element and/or
    at least one additional flow opening is arranged below the platform in the hollow structural element.

3. Wind power plant according to claim 1,
    wherein
    the control element is arranged directly at the flow opening.

4. Wind power plant according to claim 1,
    wherein
    the control element is arranged between the flow opening and the ventilation tube, between the flow opening and the interior of the hollow structural element or on the outside of the flow opening.

5. Wind power plant according to claim 1,
    wherein
    at least one further flow opening is an outflow opening and/or that the at least one flow opening is an inflow opening.

6. Wind power plant according to claim 5,
    wherein
    the platform has a second opening, in particular in the region of the outflow opening.

7. Wind power plant according claim 6,
    wherein
    the outflow opening is flow-connected to the interior of the hollow structural element below the platform via the second opening.

8. Wind power plant according to claim 6,
    wherein
    a flow valve, in particular a ⅔ flow valve, is arranged between the second opening and the outflow opening, such that an inlet of the flow valve is flow-connected to the second opening and/or the control element, that a first outlet of the flow valve is flow-connected to the outflow opening, and that a second outlet of the flow valve is flow-connected to the interior of the hollow structural element above the platform.

9. Wind power plant according to claim 1,
    wherein
    the control element is a fan, in particular a blower, a nozzle, a ventilator, a propeller and/or in that the control element is a controllable flap and/or shutter.

10. Wind power plant according to claim 1,
    wherein
    the hollow structural element is a monopile.

11. Wind power plant according to claim 1,
    wherein
    the wind power plant is a substation or a sub-station within a wind farm and/or that the wind power plant is a wind turbine.

12. Wind power plant according to claim 1,
    wherein
    the platform is a cable support receiving cables inserted through the cable entry into the hollow structural element.

13. Wind power plant according to claim 12,
    wherein
    at least one current sensor is arranged on at least one of the cables.

14. Wind power plant according to claim 13,
    wherein
    the control element is controlled or regulated depending on an amperage measured by the current sensor.

15. Wind power plant according to claim 1,
    wherein
    the platform has a first opening, in particular in the region of the flow opening.

16. Wind power plant according to claim 1,
    wherein
    the flow opening is an inflow opening flow-connected to the ventilation tube via a first opening of the platform.

17. Wind power plant according to claim 1,
    wherein
    the platform is an air tight deck.

18. Wind power plant according to claim 1,
    wherein
    the ventilation tube extends along the longitudinal axis of the hollow structural element, in particular that the ventilation tube extends vertically in the installed state.

19. Wind power plant according to claim 1,
    wherein
    the ventilation tube has outflow openings at intervals from one another, in particular at regular intervals from one another.

20. Wind power plant according to claim 19,
    wherein
    the outflow openings of the ventilation tube are formed as slots or bores and/or that the outflow openings of the ventilation tube are directed towards the center of the hollow structural element.

21. Wind power plant according to claim 1,
    wherein
    the ventilation tube is open on the bottom side or that a bottom of the ventilation tube has an outflow opening.

22. Wind power plant according to claim 1,
    wherein
    the ventilation tube ends on a bottom side of the platform in the installed state at a distance from a sea water level.

23. Wind power plant according to claim 1,
    wherein
    at least one temperature sensor is arranged in the interior of the hollow structural element below the platform.

24. Wind power plant according to claim 23,
    wherein
    the control element is controlled or regulated depending on a temperature measured by the temperature sensor.

* * * * *

UNITED STATES PATENT AND TRADEMARK OFFICE
CERTIFICATE OF CORRECTION

PATENT NO. : 11,326,581 B2
APPLICATION NO. : 17/226750
DATED : May 10, 2022
INVENTOR(S) : Obermeyer et al.

Page 1 of 1

It is certified that error appears in the above-identified patent and that said Letters Patent is hereby corrected as shown below:

In the Claims

Claim 1, Line 19 reads "the platform is a first substantially airtight platform is" and should read --the platform is a first substantially airtight platform--

Signed and Sealed this
Twenty-first Day of June, 2022

Katherine Kelly Vidal
*Director of the United States Patent and Trademark Office*